Patented Nov. 28, 1933

1,937,383

UNITED STATES PATENT OFFICE 1,937,383

MANUFACTURE OF BENZOIC ACID

Courtney Conover, St. Louis, Mo., assignor to Monsanto Chemical Company, St. Louis, Mo., a corporation of Delaware No Drawing. Application March 24, 1930
Serial No. 438,632

10 Claims. (Cl. 260—108)

This invention relates to the manufacture of benzoic acid and it has particular application to the separation of benzoic acid from contaminating acid impurities.

Benzoic acid is manufactured by causing phthalic anhydride or phthalic acid to react with steam in the presence of a catalyst. Although the equilibrium of this reaction is decidedly favorable, for practical purposes it is interrupted before all of the phthalic compound is converted into the benzoic acid. Benzoic acid made according to the above process may also contain other impurities such as maleic and fumaric acids. It is accordingly necessary to separate the product from these impurities including the unreacted phthalic acid.

As will hereinafter be more apparent, this invention is not limited to the treatment of crude benzoic acid made by any specific process, but contemplates the separation of acid impurities from any benzoic acid mixture which impurities are stronger acids than benzoic acid, or stated otherwise which have a greater affinity for bases than benzoic acid.

It has been suggested heretofore that the separation be effected by volatilizing the benzoic acid and phthalic anhydride mixture and subsequently diluting the vapors with steam whereby the phthalic anhydride reacts to form phthalic acid which is thereby precipitated from the benzoic acid vapors. Although this method of separation is effective under certain conditions, I have found that as the percentage of phthalic anhydride decreases, its separation from the benzoic acid vapors becomes increasingly difficult necessitating very careful supervision and control.

According to this invention the phthalic-benzoic mixture is treated with an amount of a basic material which is capable of reacting with the phthalic acid or anhydride to form the corresponding salt. A slight excess of the inorganic base is desirable. Thereafter the mixture is subjected to steam distillation whereby the benzoic acid is volatilized and isolated from the phthalic salt.

Various inorganic compositions may be employed for the purpose of fixing or reacting with the phthalic acid, very satisfactory results being obtained with soda ash or potash. However, other materials may be substituted such as caustic soda or caustic potash which may be added to the mixture advantageously in aqueous solution. The alkaline earth oxides, hydroxides or carbonates may likewise be employed. In lieu of these, one may employ the metallic salts of weak acids such as sodium benzoate for the purpose of fixing the phthalic acid whereby it is rendered nonvolatile under the conditions of the steam distillation.

The separation of the benzoic acid from the fixed phthalic acid may also be effected in various ways. Steam distillation is preferred. However, satisfactory results may be obtained by simple distillation, preferably at reduced pressures, sublimation, etc.

A specific example of the manner of applying the principles of my invention are hereinafter set forth. A phthalic-benzoic mixture such as that resulting from the process aforedescribed, and which may in addition contain other impurities, or, a phthalic-benzoic acid mixture which has been made in any other manner, is mixed with a mol equivalent of soda ash based on the phthalic acid which is present. An excess of the soda ash may be employed, such excess may exceed by 10 percent the calculated amount and may aggregate 100 percent or more, particularly when the amount of phthalic acid present is very small. Ordinarily the benzoic-phthalic mixture which results from my process referred to above, contains from less than 1 percent up to 2 or 3 percent of phthalic acid. The resulting mixture is stirred to insure even distribution and heated to 120°–180° C. and preferably 150° C. Thereafter and while maintaining the temperature of the mixture, super-heated steam is passed therethrough whereby the benzoic acid is volatilized to the exclusion of the phthalic acid. The volatilized product is condensed and the water is separated from the acid product in any desired manner. A benzoic acid of high quality results.

Compositions containing as high as 25% of phthalic acid may be treated advantageously by the aforementioned process. If desired, simple distillation of the benzoic acid from the mixture may be substituted for the steam distillation in which case reduced pressure should be employed to maintain a temperature approximating that which prevails with the steam distillation. I have found that if the distillation is effected at too high a temperature some phthalic anhydride is volatilized which contaminates the product even in the presence of a slight excess of base.

From the description hereinabove set forth it should be apparent that the invention contemplates the use of an inorganic base or a salt of a weak acid for the purpose of fixing, that is, rendering the phthalic acid non-volatile under the conditions of the subsequent distillation or sublimation. The invention is particularly adapted to mixtures containing less than 25% phthalic acid and is admirably suited to mixtures containing from 1 to 5%. Although I have described one specific embodiment of the principles of my invention and have enumerated various modifications which may be introduced, it will be apparent that the invention is not limited to the procedure and modifications specifically set forth but is broadly applicable to the separation of benzoic acid from a mixture thereof containing acid impurities which have a greater affinity for bases than benzoic acid. The term "phthalic acid" as used in this application is to be construed as contemplating the anhydride or the acid or mixtures thereof, as well as equivalents thereof such as analogous organic acids which are stronger than benzoic and which include maleic, fumaric, succinic and the like.

What I claim is:

1. The method of purifying benzoic acid containing phthalic acid as an impurity which comprises adding to the mixture a compound selected from the group consisting of alkali metal benzoates and alkaline earth metal benzoates, whereby benzoic acid is liberated and subsequently separating the benzoic acid.

2. The method of treating a benzoic acid mixture containing acidic impurities that are stronger than benzoic acid, which consists in adding a basic material thereto capable of reacting with the acid impurities present in the mixture to form one or more metal salts that are substantially non-volatile under the conditions of the treatment, the amount of the basic material so added being sufficient to fix the acid impurities but insufficient to combine with a substantial quantity of the benzoic acid present, and thereafter volatilizing the benzoic acid.

3. The method of separating benzoic acid from a mixture thereof containing phthalic acid which consists in treating the mixture with a material capable of reacting with the phthalic acid to form a metal salt which is relatively non-volatile under the conditions of the subsequent step in the process, the amount of the material so added being sufficient to fix the acid impurities but insufficient to combine with a substantial quantity of the benzoic acid present, and subsequently volatilizing the benzoic acid.

4. The method of treating a mixture of benzoic and phthalic acids which consists in admixing therewith a reagent capable of forming a phthalic salt which is non-volatile under the conditions of the subsequent step in the process, the amount of the reagent admixed being sufficient to fix the acid impurities but insufficient to combine with a substantial proportion of the benzoic acid present and steam distilling the benzoic acid from the resulting mixture.

5. In the manufacture of benzoic acid from phthalic anhydride whereby a mixture of phthalic and benzoic acids are formed that step which consists in adding to the mixture an organic basic material capable of forming a non-volatile salt of phthalic acid under the conditions of the subsequent step in the process the amount of the material so added being sufficient to fix the acid impurities but insufficient to combine with a substantial quantity of the benzoic acid present, and separating the benzoic acid from the mixture.

6. The method of separating benzoic acid from a mixture thereof containing phthalic acid that comprises treating the mixture with at least one of the following materials: alkali metal and alkaline earth metal oxides, hydroxides, carbonates and benzoates in an amount sufficient to combine with the phthalic acid present in the mixture and subsequently volatilizing the benzoic acid from said mixture.

7. The method of purifying benzoic acid containing phthalic acid as an impurity which comprises causing the phthalic acid to react with a basic composition capable of forming a non-volatile salt of phthalic acid under the conditions of the subsequent step in the process, the amount of the basic composition added being sufficient to fix the acid impurities but insufficient to combine with a substantial quantity of the benzoic acid present, and subsequently volatilizing the benzoic acid from the mixture.

8. The method defined in claim 7 wherein the separation of the benzoic acid from the mixture is effected by steam distillation.

9. The method as defined in claim 7 wherein the separation of the benzoic acid from the mixture is effected by steam distillation while the temperature is maintained between 120°–180° C.

10. The method defined in claim 7 wherein the phthalic impurities present are less than 25 percent of the total and the separation of benzoic acid is effected by steam distillation at a temperature between 120° C. and 180° C.

COURTNEY CONOVER.